United States Patent [19]
Fish

[11] Patent Number: 5,651,303
[45] Date of Patent: *Jul. 29, 1997

[54] FLUID CYLINDER END CAP ASSEMBLY

[75] Inventor: Elson B. Fish, Lakeville, Ind.

[73] Assignee: Polygon Company, Walkerton, Ind.

[ * ] Notice: The term of this patent shall not extend beyond the expiration date of Pat. No. 5,465,647.

[21] Appl. No.: 458,917

[22] Filed: Jun. 2, 1995

Related U.S. Application Data

[63] Continuation-in-part of Ser. No. 338,037, Nov. 14, 1994, Pat. No. 5,465,647.

[51] Int. Cl.⁶ .................................................. F01B 29/00
[52] U.S. Cl. .................. 92/128; 92/169.1; 92/168; 92/170.1; 29/888.06; 29/453; 403/319
[58] Field of Search ............... 92/169.1, 170.1, 92/164, 128, 168, 248; 29/507, 523, 888.06, 453, 525, 451, 525.1; 403/289, 290, 326, 315, 316, 319

[56] References Cited

U.S. PATENT DOCUMENTS

| | | |
|---|---|---|
| 2,155,180 | 4/1939 | Caldwell . |
| 2,234,142 | 3/1941 | Janney et al. . |
| 2,413,115 | 12/1946 | Sheehan . |
| 2,832,130 | 4/1958 | Harvey . |
| 3,703,125 | 11/1972 | Paulivkonis ........................ 92/170.1 |
| 4,073,047 | 2/1978 | Fishbaugh et al. . |
| 4,452,128 | 6/1984 | Stoll . |
| 4,531,452 | 7/1985 | Spielmann et al. . |
| 4,532,856 | 8/1985 | Taylor . |
| 4,663,819 | 5/1987 | Traylor . |
| 4,779,902 | 10/1988 | Lee . |
| 4,783,897 | 11/1988 | Basnett . |
| 4,930,204 | 6/1990 | Schurter . |
| 5,014,601 | 5/1991 | Sundholm ........................ 92/171.1 |
| 5,015,014 | 5/1991 | Sweeney . |
| 5,123,677 | 6/1992 | Kreczko et al. . |
| 5,127,157 | 7/1992 | Oetiker . |
| 5,155,892 | 10/1992 | King . |
| 5,184,391 | 2/1993 | Fisk et al. . |
| 5,219,373 | 6/1993 | Hatakeyama et al. . |
| 5,249,830 | 10/1993 | Calmettes et al. . |
| 5,257,833 | 11/1993 | McNaughton et al. . |
| 5,316,350 | 5/1994 | Kollenbrandt et al. . |
| 5,335,587 | 8/1994 | Stoll ........................ 92/171.1 |
| 5,375,507 | 12/1994 | Kladiwa et al. . |

*Primary Examiner*—Thomas E. Denion
*Attorney, Agent, or Firm*—Taylor & Associates, P.C.

[57] ABSTRACT

An end cap assembly for a fluid cylinder includes a cylindrical casing having a longitudinal axis and an open end, and an end cap closing the open end of the casing. The end cap has a first connecting device for connecting with the casing, and the casing has a second connecting device for connecting with the end cap, whereby the first and second connecting devices interconnect with each other. A backup device is disposed separate from and engaged against the casing or end cap, and prevents deflection of the engaged casing or end cap in a direction transverse to the longitudinal axis.

4 Claims, 4 Drawing Sheets

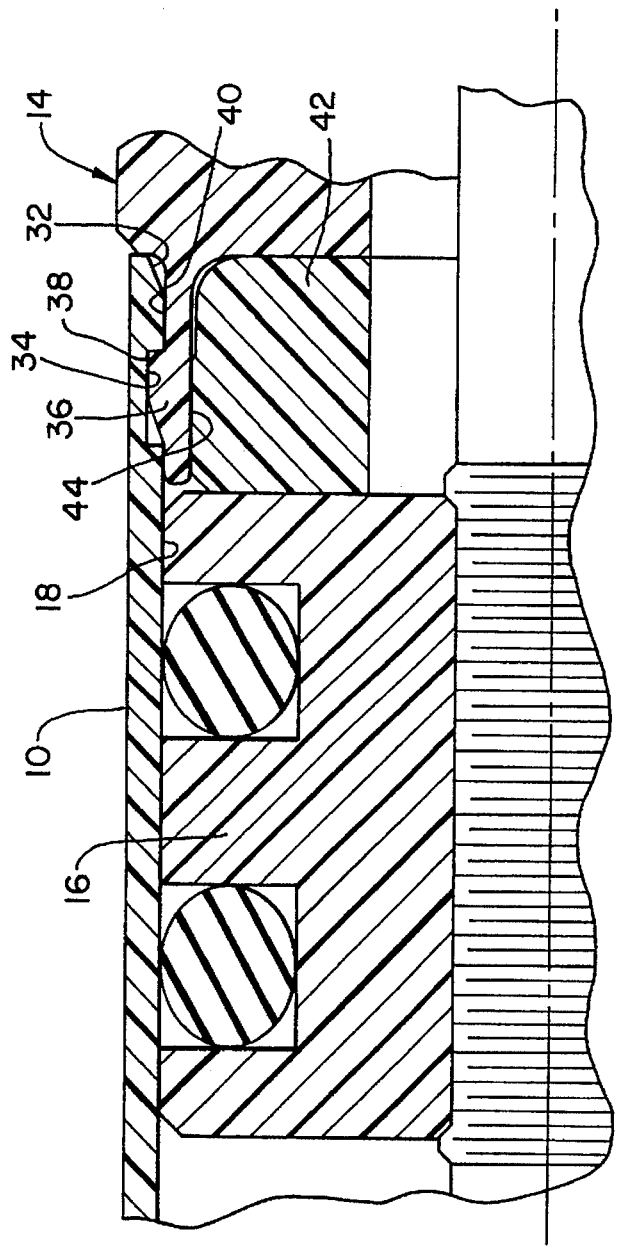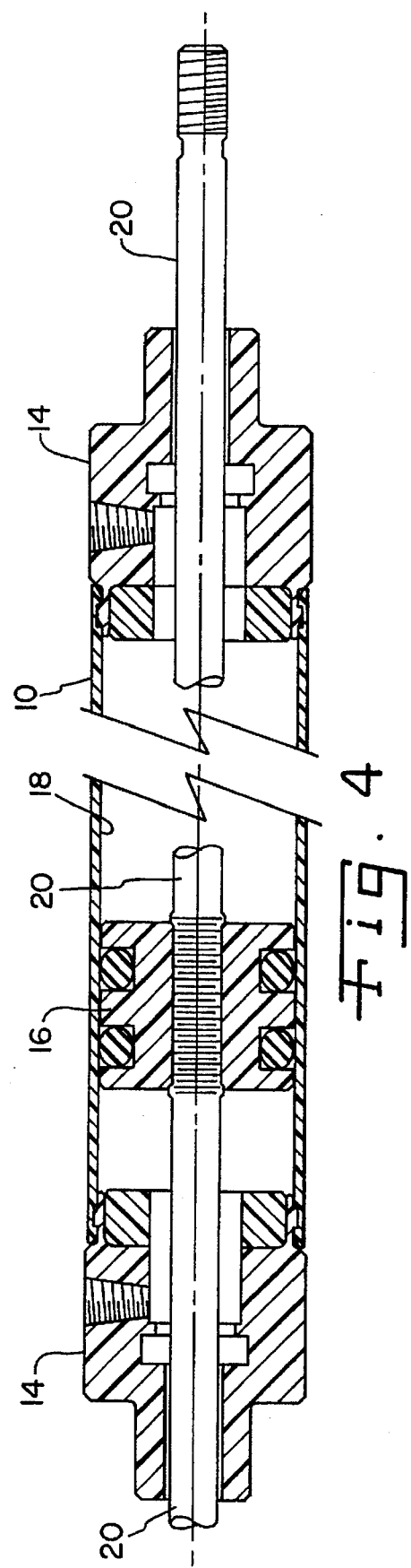

FLUID CYLINDER END CAP ASSEMBLY

CROSS REFERENCE TO RELATED APPLICATIONS

This is a continuation-in-part of U.S. patent application Ser. No. 08/338,037, filed Nov. 14, 1994 now U.S. Pat. No. 5,464,647.

BACKGROUND OF THE INVENTION

1. Field of the Invention

This invention relates to single and double-ended fluid cylinders and, more particularly, to a technique for securely retaining the end closure units at the ends of a cylindrical piston casing.

2. Description of the Related Art

Various techniques are employed to attach the end caps of power cylinders to the cylindrical piston casing. No particular problems are encountered when the elements of the power cylinder are metallic since conventional threading, swaging, and welding techniques may be employed. In many instances, however, it is desirable to construct fluid power cylinders out of plastic materials in applications where strength-to-weight ratios are important considerations and in corrosive environments. Conventional techniques employed in the assembly of metallic cylinders do not apply to plastics. It is also desirable to construct fluid power cylinders that are disposable rather than repairable since unskilled personnel may improperly replace fluid seals with disastrous consequences when the cylinder is put back into service.

SUMMARY OF THE INVENTION

The present invention comprises, in one form thereof, a fluid power cylinder having an end cap assembly for a cylindrical casing. The end cap assembly includes a pair of end caps, at least one of which comprises a closure unit having an axially-extending, cup-shaped annular skirt. The annular skirt has an outer cylindrical surface which is telescoped within an open end of the casing and has an annular barb on its outer cylindrical surface. The casing has an inside cylindrical surface which is provided with an annular groove which receives the annular barb to axially retain the annular skirt within the open end of the casing. A retaining ring is provided within the cup-shaped annular skirt and is retained therein by an interference fit to radially urge the barb into interlocking engagement with the annular groove.

The present invention comprises, in another form thereof, an end cap assembly for a fluid cylinder including a cylindrical casing having a longitudinal axis and an open end, and an end cap closing the open end of the casing. The end cap has a first connecting device for connecting with the casing, and the casing has a second connecting device for connecting with the end cap, whereby the first and second connecting devices interconnect with each other. A backup device is disposed separate from and engaged against the casing or end cap, and prevents deflection of the engaged casing or end cap in a direction transverse to the longitudinal axis.

The power cylinder is assembled by first inserting a piston in its slidable position within the casing. The piston may be associated with a single rod or a double rod in the case of a double-ended cylinder. The cup-shaped annular skirt portion of each closure unit is then telescoped within the open ends of the casing until the annular barbs snap into the annular groove at the ends of the casing. One or more of the closure units may have a bore for receiving the piston rod, or one unit may have such a bore while the other unit may be provided with a clevis for pivotally mounting the power cylinder. With the end caps in place, the piston is actuated to drive the retaining ring within the cup-shaped annular skirt. The retaining ring may have a first outer cylindrical surface which has a diameter exceeding the diameter of the inside surface of the annular skirt, and a second outer cylindrical surface having a diameter less than the diameter of the inside surface of the annular skirt. With such an arrangement, the small diameter portion of the retaining ring may be initially positioned within the annular skirt prior to seating the remaining portion of the ring in the skirt by the piston. Once the retaining rings are properly seated, the power cylinder is ready for normal operations.

According to this invention, the assembly may be constructed substantially entirely from suitable resins. For example, the casings may be produced by filament winding techniques employing an epoxy matrix material with a five percent polytetrafluoroethylene filling. The winding mandrel may be pre-wet with a gel coat to ensure inner surface smoothness, and the first pass on the mandrel may be level wound. Alternately, the casing may be done by known pultrusion techniques. The end casings and the piston head may be made by injection molding, and the piston rod may be pultruded. If necessary, a stainless steel thread insert may be provided to increase shear strength of the thread.

According to this invention, the power cylinder cannot be disassembled without totally destroying the cylinder. Moreover, the unit is chemically resistant to corrosive chemicals so that the unit may be used in hostile environments.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a cross-sectional view illustrating the completion of the assembly step illustrated in FIG. 2;

FIG. 4 is a cross-sectional elevational view of an end cap assembly for a double-ended cylinder having two piston rods connected to a piston;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
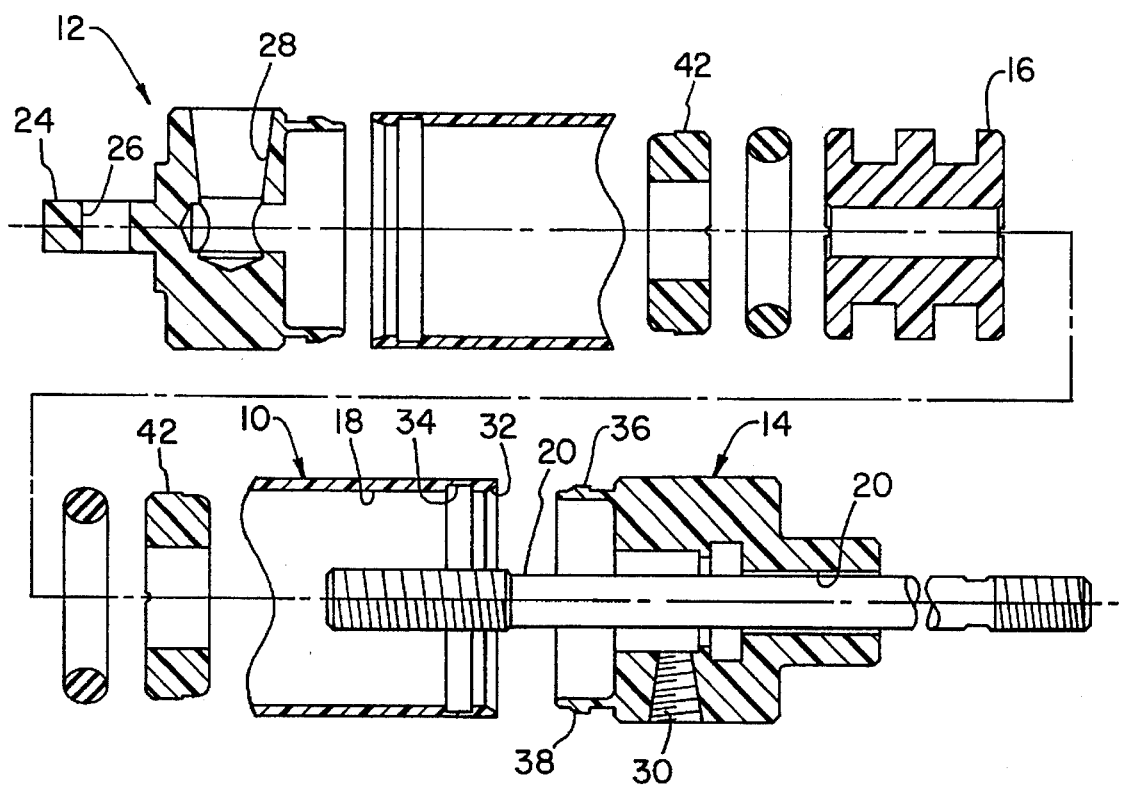
FIG. 1 is an exploded cross-sectional elevational view of an end cap assembly for a double acting fluid cylinder according to this invention.

An end cap assembly according to this invention comprises a cylindrical casing 10 closed at its ends by a pair of closure units 12 and 14. A piston 16 is slidably mounted within an inside cylindrical surface 18 of the casing 10 and has an axially-projecting piston rod 20 which slidably extends through a bore 22 in the closure unit 14. The other closure unit 12 has a projecting lug 24 having a transverse bore 26 adapted to be pivotally connected to a mounting pin. Air inlet and outlet ports 28 and 30 are provided in the closure units 12 and 14 to reciprocate the piston head 16 and its rod 20 relative to the casing 10.

The casing 10 is preferably a fiber-reinforced plastic composite which may be fabricated by filament winding a glass reinforcing roving on a pre-wetted mandrel with at least one level wound pass so that the pre-wetted mandrel will exhibit a gel coat on the inner surface of the cured composite. The resin matrix may be a five percent polytetrafluoroethylene filled epoxy. Alternately, the casing may be a pultruded tube which is manufactured according to known pultrusion techniques. In the case of a pultruded casing, vinyl ester may be employed as the matrix resin. The closure units 12 and 14 may be injection-molded from acetal resin or COMALLOY E-13370B. The piston rod may be made from 303 stainless steel or may be a pultruded composite. In the case of a pultruded rod, a threaded connection between the rod and the piston may be metallic, threaded inserts to increase the shear strength of the threads, if necessary.

Each end of the casing 10 has a conically beveled edge surface 32 and an annular groove 34. Each closure unit 12 and 14 has an axially-extending, cup-shaped annular skirt 36 having an annular barb 38 radially projecting from an outer cylindrical surface 40 of the skirt 36. The barb 38 is received within and interlocked with the annular groove 34, and a retaining ring 42 is positioned within an inside cylindrical surface 44 of the skirt 36 to provide added support so the barb 38 will not tend to back off under continuous stress. For reasons which will become apparent, the retaining ring 42 has a first outer cylindrical surface 46 which, in an uncompressed condition (see FIG. 2), is greater than the diameter of the inside surface 44 of the annular skirt 36. The retaining ring 42 has a second outer cylindrical surface 48 having a diameter which does not exceed the diameter of the inside cylindrical surface 44 of the skirt 36.

A closure unit is assembled on an end of a cylindrical casing 10 by initially positioning the piston 16 and its rod 20 in the casing. A pair of retaining rings 42 are positioned in the casing so that the piston head 16 is positioned between the rings 42 and so that the second cylindrical surface 48 of each retaining ring is positioned toward the open end of the casing 10. With these elements in place, the closure units 12 and 14 are attached to the casing by telescoping the annular skirt 36 into an open end of the casing 10 until the barb 38 seats within the annular groove 34. The conical surface 32 assists in this operation since the barb 38 is cammed inwardly along the surface 32 and then into the groove 34. As may be appreciated, a force of between five-hundred and three-thousand pounds may be required for this operation. After the closure units 12 and 14 are assembled in this manner, the retaining rings 42 are forced within the cup-shaped skirt by actuating the piston. It may be noted that the second cylindrical surface 48 has a diameter which forms a clearance fit with the inside surface 44 to act as a pilot for the retaining ring 42. The first outer cylindrical surface 46, on the other hand, forms an interference fit with respect to the surface 44 so that the skirt 36 is radially compressed as the retaining ring is completely driven into the cup-shaped skirt 36. Retaining ring 42 is seated within end cap 14 by applying an external, axial force to piston rod 20, which in turn causes piston head 16 to engage and seat retaining ring 42 within annular skirt 36.

With the piston assembled in this manner, it may be noted that it is virtually impossible to disassemble the unit without destroying the connection between the casing and the closure units.

Figure 2:
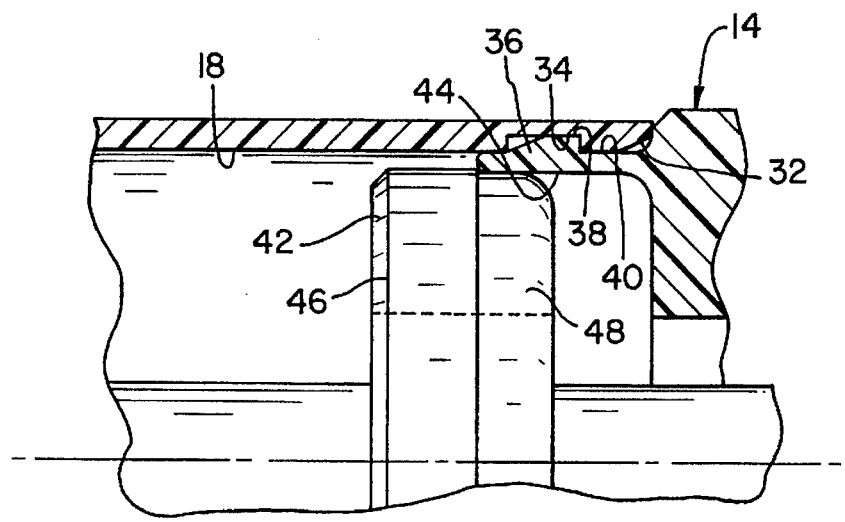
FIG. 2 is a cross-sectional view of the rod end cap illustrating a step in the assembly of that end cap to the casing.

The cylinder illustrated in FIG. 4 is generally similar to the cylinder illustrated in FIGS. 1-3. In the embodiment shown in FIG. 4, the power cylinder has a double rod 20 and the closure unit 14 is provided at both ends of the casing 10 for receiving the double rod 20. In other respects the components and assembly technique are the same.

Figure 5:
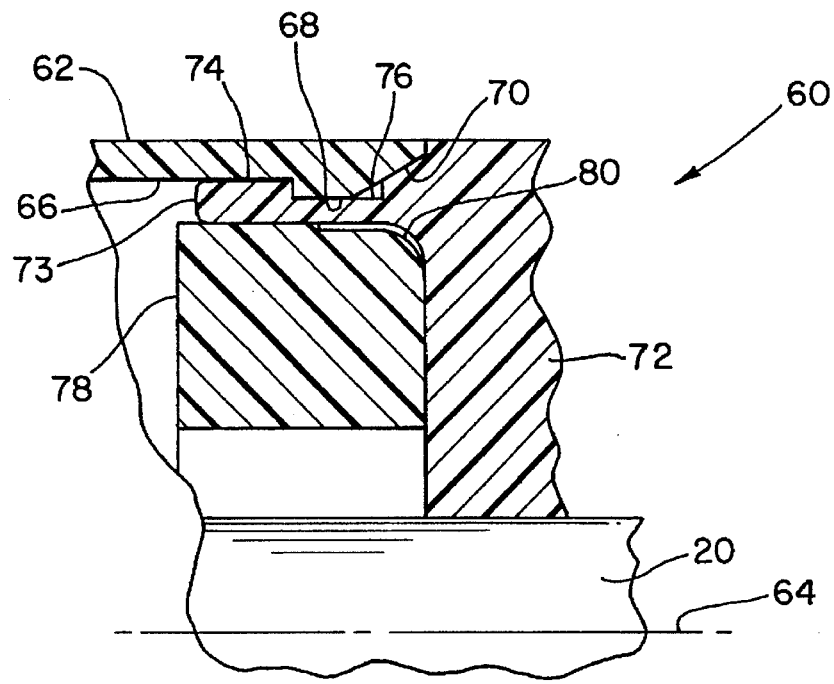
FIG. 5 is a fragmentary, sectional view of another embodiment of the end cap assembly of the present invention.

Referring now to FIG. 5, a fragmentary, sectional view of another embodiment of an end cap assembly 60 of the present invention is shown. An elongated, hollow casing 62 has a longitudinal axis which is substantially co-linear with a longitudinal axis 64 of piston rod 20. Casing 62 includes an inside surface 66 having a continuous annular projection 68 projecting radially inward therefrom. A beveled edge 70 extends from annular projection 68, and is disposed at an acute angle relative to inside surface 66.

End cap 72 closes an open end of casing 62 and includes an outer surface 74 having a continuous annular groove 76 therein. Annular projection 68 of casing 62 is disposed within annular groove 76 of end cap 72. Moreover, annular projection 68 and annular groove 76 are configured to form an interference fit and define a fluid-tight seal between casing 62 and end cap 72.

In the embodiment shown in FIG. 5, end cap 72 includes an annular skirt 73 which is configured to deflect without permanent deformation thereof a radial direction to allow interconnection between annular projection 68 and annular groove 76. More particularly, annular skirt 73 is configured to deflect in a direction transverse to a longitudinal axis of casing 62 (i.e., the longitudinal axis 64 of piston rod 20) a distance which is greater than or equal to a height of annular projection 68 (i.e., the distance which annular projection 68 extends from inside surface 66). It is thus possible to snap end cap 72 into locking and sealing engagement with casing 62, without necessarily permanently deforming end cap 72 or casing 62.

Inner retaining ring 78 includes a slightly recessed portion 80 which allows inner retaining ring 78 to be relatively easily slid radially within annular skirt 73. Inner retaining ring 78 is configured to provide an interference fit with and bias annular skirt 73 in a radially outward direction, and thereby interlock annular projection 68 with annular groove 76.

Figure 6:
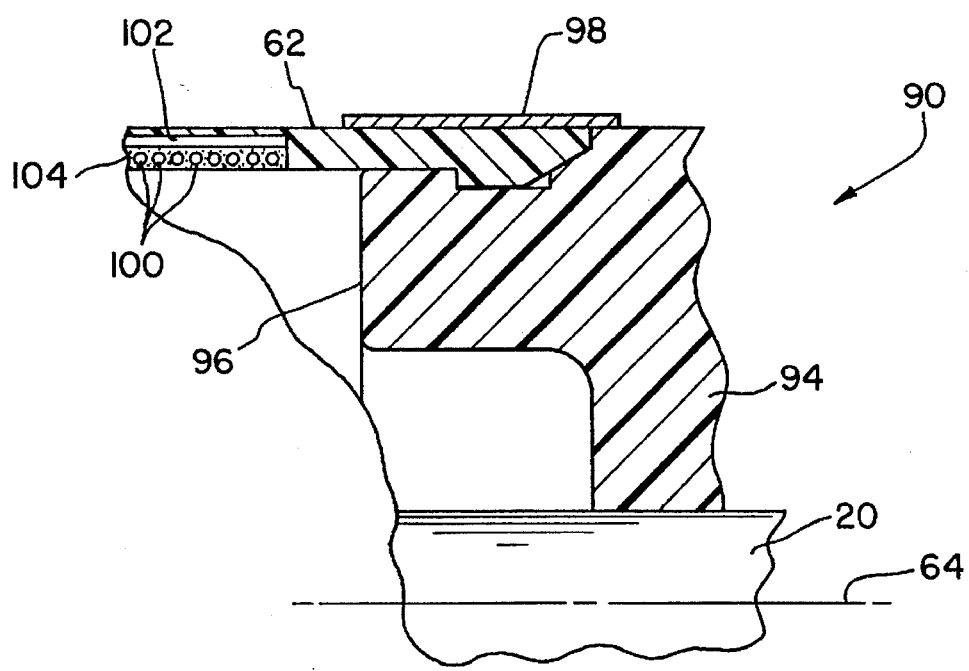
FIG. 6 is a fragmentary, sectional view of yet another embodiment of the end cap assembly of the present invention.

Referring now to FIG. 6, another embodiment of an end cap assembly 90 of the present invention is shown. End cap assembly 90 includes a casing 62 which is the same as casing 62 shown in FIG. 5. An end cap 94 is similar to end cap 72 shown in FIG. 5, but includes an annular skirt 96 which is thicker in a radial direction, as compared to annular skirt 73 shown in FIG. 5. The increased thickness of annular skirt 96 in the radial direction results in relatively little deflection of annular skirt 96 during interconnection between casing 62 and end cap 94. Thus, it is more likely that casing 62 will deflect in a direction transverse to the longitudinal axis thereof (i.e., a radially outward direction) a distance which is greater than or equal to the height of annular projection 68. After interconnection between casing 62 and end cap 94, a backup device in the form of a backup ring 98 is slid over end cap 94 and casing 62 and forms an interference fit therewith. Backup ring 98 prevents deflection of casing 62 in a radially outward direction after interconnection with end cap 94.

As shown in FIG. 6, casing 62 is made from a composite structure including a plurality of layers of fibers 100, 102 and a resinous mixture 104. Each layer of fibers 100, 102 includes a plurality of rovings which are oriented in at least one predetermined direction, with each roving constructed of a material having a corresponding modulus of elasticity. Layer 100 includes rovings which are oriented in a circumferential direction, and layer 102 includes rovings which are oriented at an acute angle relative to longitudinal axis 64. The composite structure 100, 102, 104 is configured to deflect in a radial direction such that it undergoes elastic deformation up to the point of fracture, without exhibiting permanent deformation below the point of fracture. The ability of composite structure 100, 102 and 104 to elastically deform up to the point of fracture makes it possible to interconnect casing 62 with end cap 94 without permanent deformation of casing 62, which in turn allows the snap fitting and sealed engagement between casing 62 and end cap 94.

Figure 7:
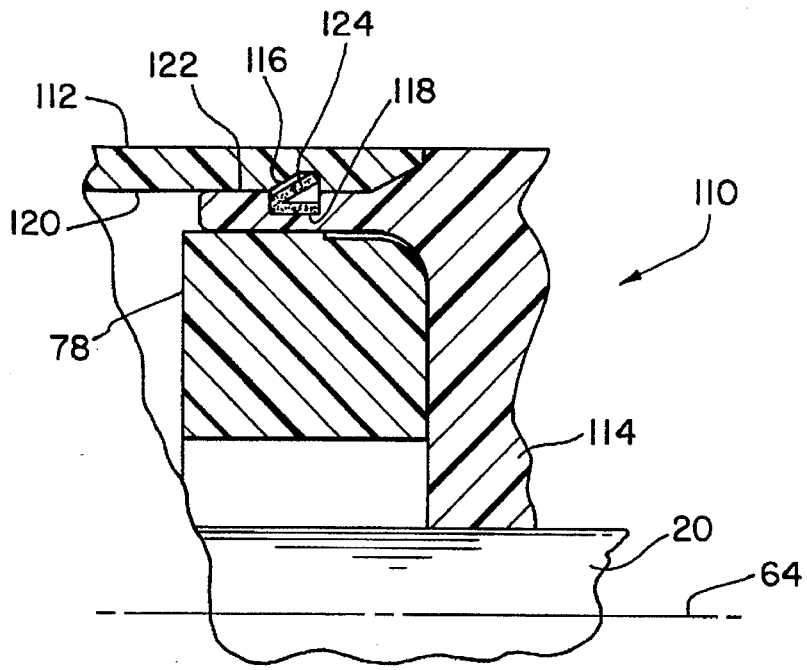
FIG. 7 is a fragmentary, sectional view of still another embodiment of the end cap assembly of the present invention.

Referring now to FIG. 7, a fragmentary, sectional view of another embodiment of an end cap assembly 110 of the present invention is shown. Instead of having a continuous, annular projection which is formed on either of casing 112 or end cap 114, a continuous annular groove 116, 118 is formed in an inside surface 120 of casing 112 and an outer surface 122 of end cap 114, respectively. Disposed within continuous annular grooves 116, 118 is a retainer ring 124 having a suitable cross sectional shape, such as the V-shaped cross section shown. An optional backup ring 78 is disposed radially within end cap 114 to prevent radially inward deflection thereof.

Figure 8:
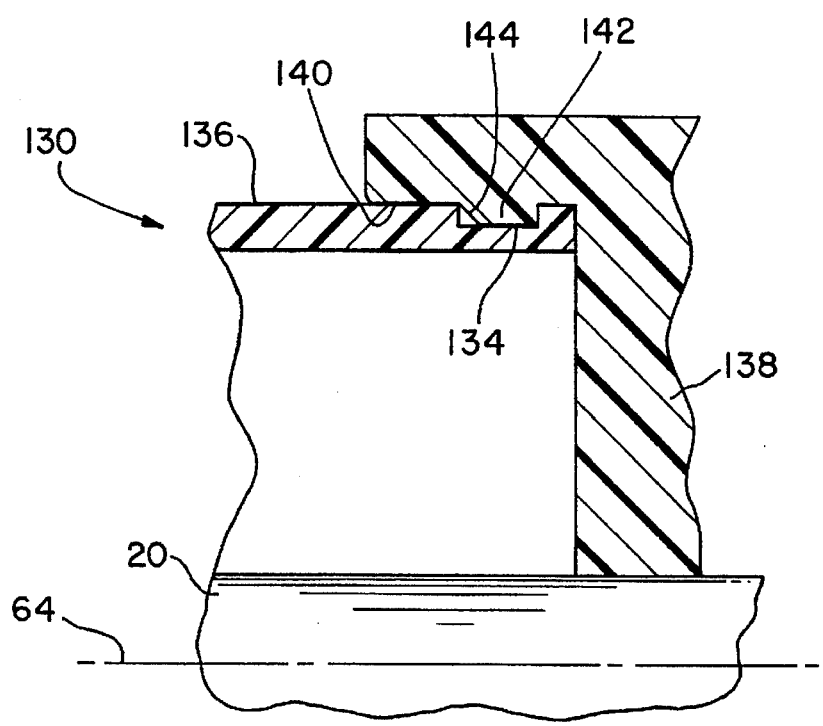
FIG. 8 is a fragmentary, sectional view of a further embodiment of the end cap assembly of the present invention.

Referring now to FIG. 8, a fragmentary, sectional view of another embodiment of an end cap assembly 130 of the present invention is shown. Casing 132 includes an annular groove 134 in an outer surface 136 thereof. End cap 138 includes an inside surface 140 having an annular projection 142 extending radially inward therefrom. Annular projection 142 has a beveled edge 144 at the leading side thereof allowing ease of assembly between casing 136 and end cap 138. End cap assembly 130 is not shown with a retaining ring either radially inward of casing 136, or radially outward of end cap 138. However, it is to be understood that such a retaining ring could be utilized to prevent radial deflection of casing 136 and/or end cap 138.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An end cap assembly for a fluid cylinder, comprising:
a cylindrical casing having open ends and an inside cylindrical surface;
a pair of end caps closing the open ends of said cylindrical casing, at least one of said end caps comprising a closure unit having an axially-extending, annular skirt having an outer cylindrical surface disposed within one of said open ends of said casing;
one of said annular skirt outer cylindrical surface and said casing inside cylindrical surface having an annular barb radially projecting therefrom, an other of said outer cylindrical surface and said casing inside cylindrical surface having an annular groove for receiving said annular barb to axially retain said annular skirt within said one open end; and
a retaining ring disposed radially within said annular skirt providing an interference fit with an inside cylindrical surface of said annular skirt to bias said annular skirt in a radially outward direction and thereby interlock said barb with said annular groove.

2. The end cap assembly of claim 1, wherein said annular barb and said annular groove define a fluid-tight seal between said casing and said end cap.

3. A method of assembling an end cap on an open end of a tubular pressure cylinder comprising the steps of:
providing a cylindrical casing having an open end and an inside cylindrical surface;
providing a closure unit for said open end, said closure unit having an axially-extending annular skirt having an outer cylindrical surface, one of said annular skirt outer cylindrical surface and said casing inside cylindrical surface having an annular barb radially projecting therefrom, an other of said annular skirt outer cylindrical surface and said casing inside cylindrical surface having an annular groove adapted to receive said annular barb;
positioning a retaining ring within said cylinder, said retaining ring having an outside diameter adapted to form an interference fit with said inside cylindrical surface of said skirt;
positioning a piston head within said inside cylindrical surface of said cylinder so that said retaining ring is positioned between said piston head and said one of said open ends;
moving said annular skirt into said open end of said cylindrical casing until said annular barb seats within said annular groove; and
driving said piston head against said retaining ring to force said retaining ring along said inside cylindrical surface of said annular skirt and to seat said retaining ring within said annular skirt with an interference fit.

4. An end cap assembly for a fluid cylinder, comprising:
a cylindrical casing having a longitudinal axis and an open end;
an end cap closing said open end of said casing;
said end cap having a first connecting means for connecting with said casing, and said casing having a second connecting means for connecting with said end cap, said first and said second connecting means interconnecting with each other; and
backup means, separate from and engaged against one of said casing and said end cap, for preventing deflection of said engaged casing or end cap in a direction transverse to said longitudinal axis;
wherein said end cap includes an annular skirt, and wherein said backup means comprises a retaining ring disposed radially within said annular skirt providing an interference fit with an inside cylindrical surface of said annular skirt.

* * * * *